(12) United States Patent
Calpito

(10) Patent No.: US 12,212,019 B2
(45) Date of Patent: Jan. 28, 2025

(54) MULTIPLE-DIRECTION WEDGE WIRE BONDING

(71) Applicant: Atieva, Inc., Newark, CA (US)

(72) Inventor: DodgieReigh M. Calpito, Fairfield, CA (US)

(73) Assignee: Atieva, Inc, Newark, CA (US)

( * ) Notice: Subject to any disclaimer, the term of this patent is extended or adjusted under 35 U.S.C. 154(b) by 795 days.

(21) Appl. No.: 17/448,796

(22) Filed: Sep. 24, 2021

(65) Prior Publication Data

US 2023/0102771 A1   Mar. 30, 2023

(51) Int. Cl.
*H01M 50/503* (2021.01)
*H01M 50/298* (2021.01)
*H01M 50/516* (2021.01)

(52) U.S. Cl.
CPC ....... *H01M 50/503* (2021.01); *H01M 50/298* (2021.01); *H01M 50/516* (2021.01)

(58) Field of Classification Search
CPC . H01M 50/503; H01M 50/516; H01M 50/298
See application file for complete search history.

(56) References Cited

U.S. PATENT DOCUMENTS 10,044,126 B2   8/2018   Krebs et al.

OTHER PUBLICATIONS

C. Ruoff: "A closer look at wire bonding," Charged Electric Vehicles Magazine, Issue 24, Apr. 28, 2016, 16 pages.
J. Powell: "Benefits of Reverse Wire Bonding & Stand-Off Stitch," PTI Blog, Jan. 22, 2013, 2 pages.
Palomar Technologies, "Modern Wedge Bonding eBook," Oct. 8, 2021, 25 pages.
International Search Report and Written Opinion for PCT Application No. PCT/US2022/076839, mailed on Jan. 13, 2023, 10 pages.
"Wirebonding", Nexcharge; https://evreporter.com/what-is-wire-bonding-li-ion-battery-packs/; Apr. 10, 2021, 1 page.

*Primary Examiner* — Jane J Rhee
(74) *Attorney, Agent, or Firm* — Brake Hughes Bellermann LLP

(57) ABSTRACT

In a general aspect, an electrical device assembly (e.g., a battery module) can include first, second and third electrical contact surface. The first and second electrical contact surfaces can be spaced from the third electrical contact surface in a common direction. The assembly can include a ribbon wire electrically coupling the first electrical contact surface with each of the second electrical contact surface and the third electrical contact surface. A first end of the ribbon wire can be wedge bonded to the first electrical contact surface with a first wedge wire bond, a second end of the ribbon wire can be wedge bonded to the second electrical contact surface with a second wedge wire bond, and a portion of the ribbon wire that is intermediate between the first and second ends can be wedge bonded to the third electrical contact surface with a third wedge wire bond.

20 Claims, 4 Drawing Sheets

MULTIPLE-DIRECTION WEDGE WIRE BONDING

TECHNICAL FIELD

This document relates to wedge wire bonding.

BACKGROUND

Bond wires are used to electrically interconnect different elements or components in electrical device assemblies. In such assemblies, such bond wire electrical interconnections can introduce unwanted electrical resistance. Accordingly, approaches to reduce such resistance and improve electrical conductivity of such interconnects is desired.

SUMMARY

In a general aspect, an electrical device assembly (e.g., a battery module) can include a first electrical contact surface, a second electrical contact surface, and a third electrical contact surface. The first and second electrical contact surfaces can be spaced from the third electrical contact surface in a common direction. The assembly can further include a ribbon wire electrically coupling the first electrical contact surface with each of the second electrical contact surface and the third electrical contact surface. A first end of the ribbon wire can be wedge bonded to the first electrical contact surface with a first wedge wire bond. A second end of the ribbon wire can be wedge bonded to the second electrical contact surface with a second wedge wire bond. A portion of the ribbon wire that is intermediate between the first and second ends can be wedge bonded to the third electrical contact surface with a third wedge wire bond.

Implementations can include one or more of the following features. For example, the electrical device assembly can include a battery module that includes a busbar and an electrochemical cell. The busbar can include the first electrical contact surface and the second electrical contact surface. A terminal of the electrochemical cell can include the third electrical contact surface. The terminal can be located at an end of the electrochemical cell. The terminal includes one of a rim of the electrochemical cell or a cap of the electrochemical cell.

A first segment of the ribbon wire can extend between the first wedge wire bond and the third wedge wire bond. A second segment of the ribbon wire can extend between the third wedge wire bond and the second wedge wire bond. The first segment of ribbon wire and the second segment of the ribbon wire can define an angle less than about 45 degrees. The ribbon wire can include a first surface and a second surface opposite the first surface. The first surface of the ribbon wire can face the first electrical contact surface and the third electrical contact surface. The second surface of the ribbon wire can face the second electrical contact surface.

The first electrical contact surface, the second electrical contact surface and the third electrical contact surface can each be respectively included in one of a busbar of a battery module, or a terminal of an electrochemical cell of the battery module.

The first electrical contact surface can be included in a terminal of a first electrochemical cell of a battery module. The second electrical contact surface can be included in a terminal of a second electrochemical cell of the battery module. The third electrical contact surface can be included in a busbar of the battery module.

The portion of the ribbon wire that is intermediate between the first end and the second end can be a first portion of the ribbon wire that is intermediate between the first end and the second end. The electrical device assembly can include a fourth electrical contact surface that is separate from the first electrical contact surface, the second electrical contact surface and the third electrical contact surface. A second portion of the ribbon wire that is intermediate between the first end and the second end can be wedge bonded to the fourth electrical contact surface with a fourth wedge wire bond.

A first segment of the ribbon wire can extend between the first wedge wire bond and the third wedge wire bond, a second segment of the ribbon wire can extend between the third wedge wire bond and the fourth wedge wire bond, and a third segment of the ribbon wire can extend between the fourth wedge wire bond and the second wedge wire bond. The first segment of the ribbon wire and the second segment of the ribbon wire can define an angle less than about 45 degrees. The second segment of the ribbon wire and the third segment of the ribbon wire can define an angle greater than about 135 degrees, or an angle less than about 45 degrees. The first electrical contact surface, the second electrical contact surface, the third electrical contact surface and the fourth electrical contact surface can each be included, respectively, in one of a busbar of a battery module or an electrochemical cell of the battery module.

In another general aspect, a battery module can include a plurality of electrochemical cells. Each electrochemical cell of the plurality of electrochemical cells can have a terminal at an end of the electrochemical cell. The battery module can also include a busbar to couple the plurality of electrochemical cells in one of a parallel connection, a series connection, or a parallel and series connection. The battery module can further include a ribbon bond wire that is electrically coupled with the busbar via a first wedge bond and a second wedge bond, and electrically coupled with the terminal of an electrochemical cell of the plurality of electrochemical cells via a third wedge bond. A first segment of the ribbon bond wire can extend between the first wedge bond and the third wedge bond. A second segment of the ribbon bond wire can extend between the third wedge bond and the second wedge bond. The first segment of the ribbon bond wire and the second segment of the ribbon bond wire can define an angle of less than about 45 degrees.

Implementations can include one or more of the following features. For example, the terminal of the electrochemical cell of the plurality of electrochemical cells can include one of a rim or a cap. The electrochemical cell of the plurality of electrochemical cells can be a first electrochemical cell. The ribbon bond wire can be further electrically coupled with the terminal of a second electrochemical cell of the plurality of electrochemical cells via a fourth wedge bond. A third segment of the ribbon bond wire can extend between the second wedge bond and the fourth wedge bond. The second segment of the ribbon bond wire and the third segment of the ribbon bond wire can define an angle of less than about 45 degrees, or an angle of greater than about 135 degrees.

In another general aspect, a method can include forming, using a wedge bonder head, a first wedge wire bond with a ribbon wire on a first electrical contact surface. After forming the first wedge wire bond, the method can include feeding a first portion of the ribbon wire through the wedge bonder head. The method can further include moving the wedge bonder head along a first direction of travel to form a first wire loop including the first portion of the ribbon wire. The method can still further include forming, using the wedge bonder head, a second wedge wire bond with the ribbon wire on a second electrical contact surface. After forming the second wedge wire bond, the method can include feeding a second portion of the ribbon wire through the wedge bonder head, rotating the wedge bonder head; and moving the wedge bonder head along a second direction of travel, different from the first direction of travel, to form a second wire loop including the second portion of the ribbon wire. The method can also include forming, using the wedge bonder head, a third wedge wire bond with the ribbon wire on a third electrical contact surface.

Implementations can include one or more of the following features. For example, rotating the wedge bonder head can include rotating the wedge bonder head between about 45 degrees and about 180 degrees.

The method can include feeding a third portion of the ribbon wire through the wedge bonder head, further altering the direction of travel of the wedge bonder head by further rotating the wedge bonder head, and moving the wedge bonder head along the further altered direction of travel to form a third wire loop including the third portion of the ribbon wire. After moving the wedge bonder head along the further altered direction of travel, the method can include forming, using the wedge wire bonder head, a fourth wedge wire bond with the ribbon wire on a fourth electrical contact surface.

BRIEF DESCRIPTION OF DRAWINGS

Like reference symbols in the various drawings indicate like elements.

DETAILED DESCRIPTION

Figure 1:
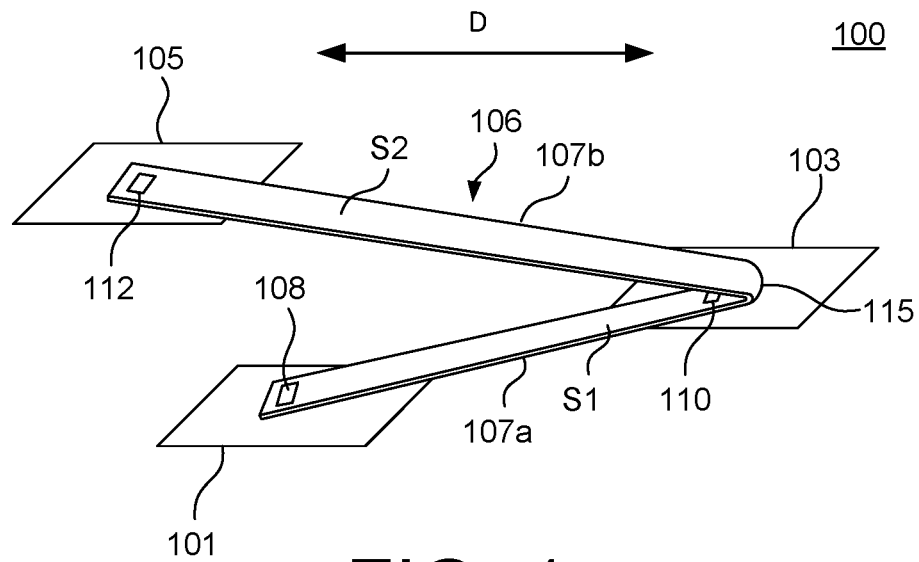
FIG. 1 is a diagram schematically illustrating an electrical device assembly.

This document describes examples of systems and techniques directed to formation of wedge wire bonds in multiple directions using a continuous bond wire, where such approaches are referred to herein as multiple-direction wire bonding or multiple-direction wedge wire bonding. In some implementations, multiple-direction wire bonding can include forming, using a wire bonder head (e.g., a wedge wire bonder head), a first wire bond; moving the wire bonder head in a first direction of travel; forming a second wire bond; rotating the wire bonder head; moving the wire bonder head in a second direction of travel that is different than the first direction of travel; and forming a third wire bond. The subject matter described herein can improve the performance of corresponding electrical device assemblies, such as battery modules used in electric and/or hybrid vehicles. For example, electrical interconnects between electrical contact surfaces (e.g., terminals of electrochemical cells and/or busbars of a battery module) can have increased conductivity as a result of electrical resistance of being reduced. Such reduced resistance can be achieved as a result of a continuous length of bond wire being used to electrically connect a plurality of electrical contact surfaces arranged in different directions relative to one another, rather using individual bond wire segments (e.g., respective individual bond wire segments for each different direction).

Examples herein refer to bond wires (e.g., ribbon bond wires or ribbon wires). As used herein, a bond wire can have any number of different geometries, and can include one or more materials having respective conductivities. For instance, a bond wire can be a single layered bond wire, or can be a multi-layered bond wire that has a plurality of layers each having a respective conductivity. In some implementations, a bond wire can be a ribbon wire having a rectangular cross-section and having one or more layers. The one or more layers can include one or more electrically conductive materials, such as one or more metals and/or metal alloys. As used herein, a bond wire being coupled to a surface (e.g., a conductive surface, electrical contact surface, etc.) refers to the bond wire being electrically and/or physically coupled with that surface, unless otherwise indicated.

Examples herein refer to segments of a bond wire (e.g., bond wire segments). As used herein, a bond wire segment is a portion of a bond wire that extends between separate wire bonds (e.g., wedge wire bonds). For instance, in some implementations, a bond wire (e.g., a continuous bond wire) can include a first bond wire segment extending between a first wire bond and a second wire bond, and further include a second segment extending between the second wire bond and a third wire bond. In example implementations, the first bond wire segment and the second bond wire segment can define a non-zero angle. For instance, the angle can be less than about 45 degrees, or can be greater than about 135 degrees. A bond wire can also include additional bond wire segments and additional wire bonds.

Examples herein refer to wire loops. As used herein, a wire loop can be part of bond wire segment that extends between two wedge wire bonds. For instance, a wire loop can electrically connect a first wedge wire bond and its corresponding electrical contact surface with a second wedge wire bond and it corresponding electrical contact surface. In implementations, a wire loop can be flat, curved, arced, or a combination thereof.

Examples herein refer to electrochemical cells. As used herein, an electrochemical cell is a device that generates electrical energy from chemical reactions, or uses electrical energy to cause chemical reactions, or both. An electrochemical cell can include an electrolyte and two electrodes to store energy and deliver it when used. In some implementations, the electrochemical cell can be a rechargeable cell. For example, the electrochemical cell can be a lithium-ion cell. In some implementations, the electrochemical cell can act as a galvanic cell when being discharged, and as an electrolytic cell when being charged. The electrochemical cell can have at least one terminal for each of the electrodes. The terminals, or at least a portion thereof, can be positioned at one end of the electrolytic cell. For example, when the electrochemical cell has a cylindrical shape, one of the terminals can be provided in the center of the end of the cell, and the can that forms the cylinder can constitute the other terminal and therefore be present at the end as well. Other shapes of electrochemical cells can be used, including, but not limited to, prismatic shapes.

Examples herein refer to a battery module, which is an individual component configured for holding and managing multiple electrochemical cells during charging, storage, and use. The battery module can be intended as the sole power source for one or more loads (e.g., electric motors), or more than one battery module of the same or different type can be used. Two or more battery modules can be implemented in a system separately or as part of a larger energy storage unit. For example, a battery pack can include two or more battery modules of the same or different type. A battery module can include control circuitry for managing the charging, storage, and/or use of electrical energy in the electrochemical cells, or the battery module can be controlled by an external component. For example, a battery management system can be implemented on one or more circuit boards (e.g., a printed circuit board).

Examples herein refer to a busbar, where a corresponding battery module can have at least one busbar. The busbar is electrically conductive and is used for conducting electricity to the electrochemical cells when charging, or from the cells when discharging. The busbar is made of an electrically conductive material (e.g., metal) and has suitable dimensions considering the characteristics of the electrochemical cells and the intended use. In some implementations, the busbar comprises aluminum (e.g., an aluminum alloy). A busbar can be planar (e.g., flat) or can have one or more bends, depending on the shape and intended use of the battery module.

Examples herein may refer to a top or a bottom. These and similar expressions identify things or aspects in a relative way based on an express or arbitrary notion of perspective. That is, these terms are illustrative only, used for purposes of explanation, and do not necessarily indicate the only possible position, direction, and so on.

FIG. 1 is a diagram schematically illustrating an electrical device assembly 100 including multiple-direction wire bonds. As shown in FIG. 1, the assembly 100 includes electrical contact surfaces 101, 103 and 105, and a bond wire (e.g., a ribbon bond wire) 106 that is coupled with the electrical contact surfaces 101, 103, 105 using multiple-direction wire bonding. As shown in FIG. 1, the electrical contact surfaces 101 and 105 are spaced from the electrical contact surface 103 in a common direction along a line D. The bond wire 106 includes a segment 107a, and a segment 107b. In some implementations, each of the electrical contact surfaces 101, 103 and 105 can be respectively included in one of a busbar or a battery terminal of a battery module, such as battery module used in an electric and/or hybrid vehicles.

In the assembly 100, the bond wire 106 is coupled with the electrical contact surface 101 via a wedge wire bond 108, is coupled with the electrical contact surface 103 via a wedge wire bond 110, and is coupled with the electrical contact surface 105 via a wedge wire bond 112. As shown in FIG. 1, the segment 107a of the bond wire 106 extends between the wedge wire bond 108 and the wedge wire bond 110, while the segment 107b of the bond wire 106 extends between the wedge bond 110 and the wedge bond 112. The bond wire 106 includes a bend 115 that changes a direction of the bond wire 106 in the assembly 100. In the present illustration, the segment 107a, from the wedge bond 108 to the wedge bond 110, generally extends left to right along the line D, while the segment 107b, from the wedge bond 110 to the wedge bond 112 (e.g., after the bend 115), generally extends right to left along the line D. As also shown in FIG. 1, the bond wire 106 has a surface S1 in the segment 107a that is here upward facing, and a surface S2 in the segment 107b that is also upward facing in this illustration. The surface S1 of the bond wire 106 is opposite the surface S2 in the geometry of the bond wire 106. Accordingly, in this example, the surface S2 faces (e.g., is wire bonded to) the electrical contact surfaces 101 and 103, while the surface S1 faces (e.g., is wire bonded to) the electrical contact surface 105. In some implementation, the wire bonds 108, 110 and 112 can be formed using ultrasonic vibration of the wedge to attach (e.g., fuse, bond, etc.) the bond wire 206 to the respective conductive surface. In other implementations, wire bonds used in multiple-direction wire bonding can be formed using other appropriate approaches, such as laser bonding.

Figure 2:
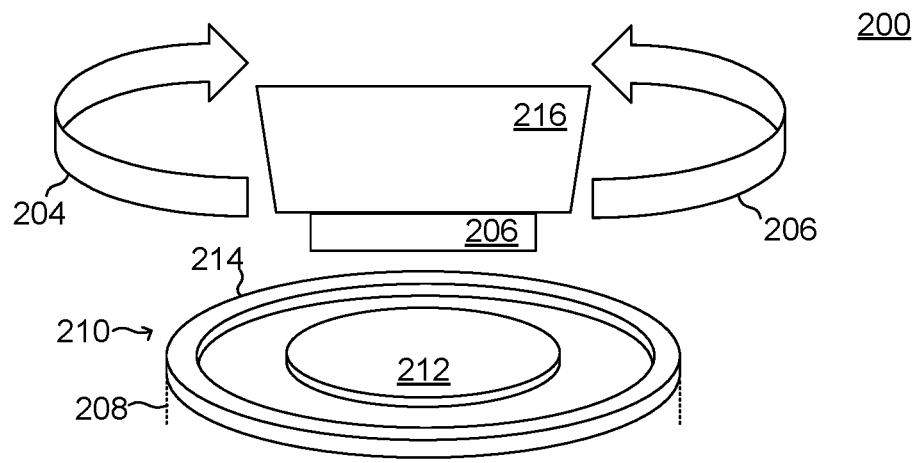
FIG. 2 is a diagram illustrating an example of a bond wire and a bonding operation.

FIG. 2 is a diagram illustrating an example of a wire bond operation 200. In example implementations, the wire bond operation 200 can be used to perform multiple-direction wire bonding, such as in accordance with the example implementations described herein. In this example, as shown in FIG. 2, a ribbon bond wire (ribbon wire, bond wire, or wire) 206 can be fed through a wedge wire bonder head, such that the bond wire 206 is disposed below a bonding wedge 216. In some implementations, the wedge can be steel or another metal.

In FIG. 2, the bond wire 206 is shown in a side view from an end of the bond wire 206. FIG. 2 also illustrates a portion of a electrochemical cell 208 that can be included in a battery module, to which a wedge bond can be formed, e.g., as part of a multiple-direction wire bonding operation. Also shown in FIG. 2 are arrows 204 and 206 indicating, respectively, clockwise rotation of the wedge 216 (and an associated wedge bonder head) and counterclockwise rotation of the wedge 216. Such rotation can be used to change a direction of travel of the wedge 216 and a corresponding direction in which the bond wire 206 is fed or deployed when performing multiple-direction wire bonding operations.

In example implementations, the bond wire 206 can be shaped (e.g., as a result of forming wire bonds, wire loops or segments, and/or bends) to be suitable for its intended use of forming multiple-direction wire bonds between separate electric contact surfaces (e.g., electrical contact surfaces 101, 103 and 105), which can also be referred to as conductive surfaces. In implementations, the conductive surfaces can be substantially parallel to each other (e.g., co-planar or in parallel planes), or the conductive surfaces can be oriented in different directions. As another example, the conductive surfaces can be positioned at substantially a same level relative to a reference level (e.g., co-planar), or the conductive surfaces can be positioned at different levels relative to the reference level (e.g., non-co-planar).

In some implementations, the shape of the ribbon bond wire 206 can result from the process by which the bond wire 206 is installed to electrically connect the associated conductive surfaces. For example, the bond wire 206 can initially be kept as stock material on a spool, and a suitable length of the bond wire 206 can be installed to form multiple-direction wire bonding that provides an electrical connection between two or more conductive surfaces, thereby assuming a shape suitable for connecting those surfaces, e.g., such as including appropriate wire loops between respective wedge bonds formed on the conductive surfaces, as well as bends for changing directions. Depending on the particular implementation, the bond wire 206 can include copper, aluminum, a copper alloy, an aluminum alloy, and/or a combination thereof. In some implementations, the bond wire 206 can be a multi-layered ribbon wire that includes layers of different material that are bonded to each other (e.g., laminated, swaged, adhesive attached, etc.).

In the example of FIG. 2, the bonding operation 200 can include electrically bonding the bond wire 206 to a portion of an electrochemical cell 208 of a battery module. Here, only an end 210 of the electrochemical cell 208 is shown for simplicity. In some implementations, the end 210 can be referred to as a top of the electrochemical cell 208. For example, the electrochemical cell 208 can include a can (not shown) to hold active materials, and the end 210 can be formed by a cap that seals an opening of the can.

The electrochemical cell 208 can have multiple terminals. Here, a terminal 212 is shown as a structure positioned at a center of the end 210. For example, the terminal 212 can be a positive terminal of the electrochemical cell 208. Here, a rim 214 included in the end 210 is at least a part of another terminal of the electrochemical cell 208. For example, the rim 214 (and a remainder of the can material, including a bottom of the can) may serve as a negative terminal of the electrochemical cell 208. In such approaches, the terminal 212 and the rim 214 can be electrically insulated from one another.

The bonding operation 200 can include use of one or more tools. In some implementations, such as those described herein, a wedge wire bonding head can be used, where the wedge 216 can be included in the wedge wire bonding head. For instance, in this example the wedge 216 can be used to bond the bond wire 206 to the terminal 212, or the rim 214. In implementations, the wedge 216 can be made of metal. In implementations, after formation of formation of a first bond wire segment and its associated wedge wire bonds, the wedge 216 (and an associated bonder head) can be rotated (e.g., using a stepper motor, or other rotary motor) to change a direction of travel of the wedge 216, as well as a direction in which a next bond wire segment is formed. For instance the wedge bonder head can be rotated clockwise (204) or counter-clockwise (205). After rotating the wedge bonder head, the wedge bonder head can move to a subsequent electrical contact surface, and the bond wire 206 (e.g., continuous from the previous wire bond) can be bonded to that subsequent electrical contact surface.

In some implementations, the bond wire 206 can, as part of a multiple-direction wire bonding operation, be wedge bonded to the rim 214 of the electrochemical cell 208. In such implementations, the bond wire 206 can have any appropriate orientation relative to the rim 214. For instance, in some implementations, the orientation of the bond wire 206 (e.g., a length of a corresponding bond wire segment) can be substantially radial relative to the rim 214. In other implementations, the bond wire 206 can be oriented substantially in a tangential direction relative to the rim 214. In still other implementations, other orientations of the bond wire 206 relative to the rim 214 can be used.

FIGS. 3A-3E are diagrams schematically illustrating examples of multiple-direction wedge wire bonding. Specifically, the examples of FIGS. 3A-3E illustrate multiple-direction wire bonding in respective battery modules, or portions of respective battery modules 300a, 300b, 300c, 300d and 300e. In the examples of FIGS. 3A-3E, for simplicity, respective multi-direction bond wires are shown, without explicitly showing the associated wire bonds and/or bends in the bond wires. In implementations, such aspects of the multi-direction wire bonds of FIGS. 3A-3E can be similar to those aspects of the multi-direction wire bonds shown in FIG. 1 and described above. In some implementations, the multiple-direction wire bonding approaches shown in FIGS. 3A-3E can be implemented in conjunction with one another. That is, one or more aspects of one multiple-direction wire bonding approach can be combined with aspect of another multiple-direction wire bonding approach. In some implementations, an order in which wire bonds in a multiple-direction wire bonding operation are formed can be reversed from the example shown herein. That is, starting and ending electrical contact surfaces for multiple-direction wire bonding operations can be reversed.

Figure 3A:
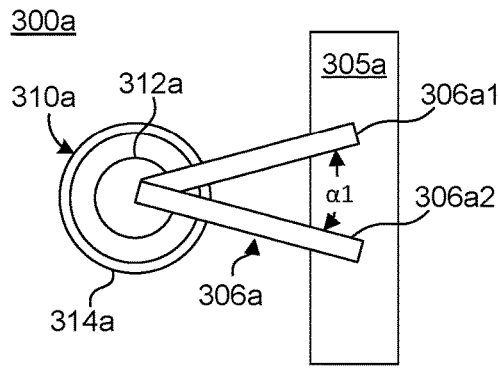
FIGS. 3A-3E are diagrams schematically illustrating examples of multiple-direction wedge wire bonding.

FIG. 3A illustrates a battery module 300a, which can be a portion of a battery module or battery pack. In FIG. 3A, a busbar 305a, an end 310a of an electrochemical cell, and a bond wire 306a of the battery module 300a are shown. The end 310a of the electrochemical cell includes a terminal 312a and a rim 314a, while the bond wire 306a includes a segments (bond wire segments) 306a1 and 306a2.

In the battery module 300a, the bond wire 306a electrically couples the busbar 305a with the terminal 312a via multiple-direction wire bonding. For instance, in this example, the segment 306a1 of the bond wire 306a is wire bonded to the busbar 305a and the terminal 312a. Further in this example, the segment 306a2 is wire bonded to the bus busbar 305a, where a bend in the bond wire 306a changes a direction along which the segment 306a2 is arranged, relative to a direction along which the segment 306a1 is arranged.

That is, in this example, a first end of the bond wire 306a is wire bonded to a first electrical contact surface (e.g., that is part of the busbar 305a), a second end of the bond wire 306a is wire bonded to a second electrical contact surface (e.g., that is also part of the busbar 305a). Further in this example, a portion of the bond wire 306a that is intermediate between its first end and its second end is wire bonded to a third electrical contact surface (e.g., that is part of the terminal 312a).

In the battery module 300a, the segment 306a1 and the segment 306a2 define an angle $\alpha 1$. In some implementations, the angle $\alpha 1$ can be greater than zero degrees (0°) and less than about forty-five degrees (45°). In the examples of FIGS. 3B-3E, segments of bond wires used to implement multiple-direction wire bonds can define similar angles. For clarity and brevity, such angles may not be specifically indicated.

Figure 3B:
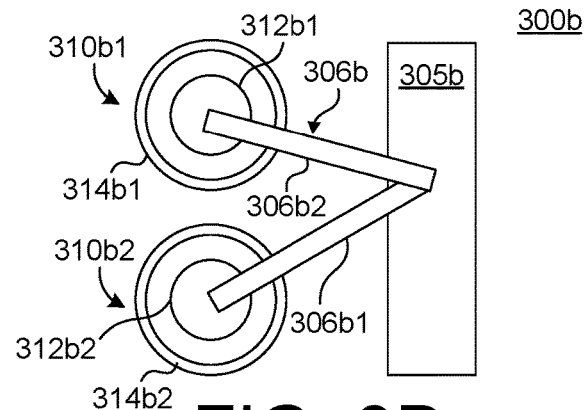

FIG. 3B illustrates a battery module 300b, which can be a portion of a battery module or battery pack. In FIG. 3B, a busbar 305b, an end 310b1 of a first electrochemical cell, an end 310b2 of a second electrochemical cell, and a bond wire 306b of the battery module 300b are shown. The end 310b1 of the first electrochemical cell includes a terminal 312b1 and a rim 314b1. The end 310b2 of the second electrochemical cell includes a terminal 312b2 and a rim 314b2. The bond wire 306b includes segments 306b1 and 306b2.

In the battery module 300b, the bond wire 306b electrically couples the busbar 305b with the terminals 312b1 and 312b2 via multiple-direction wire bonding. For instance, in this example, the segment 306b1 of the bond wire 306b is wire bonded to the terminal 312b2 and the busbar 305b. Further in this example, the segment 306b2 is wire bonded to the terminal 312b1, where a bend in the bond wire 306b changes a direction along which the segment 306b2 is arranged, relative to a direction along which the segment 306b1 is arranged.

That is, in this example, a first end of the bond wire 306b is wire bonded to a first electrical contact surface (e.g., that is part of the terminal 312b2), a second end of the bond wire 306b is wire bonded to a second electrical contact surface (e.g., that is part of the terminal 312b1). Further in this example, a portion of the bond wire 306b that is intermediate between its first end and its second end is wire bonded to a third electrical contact surface (e.g., that is part of the busbar 305b).

Figure 3C:
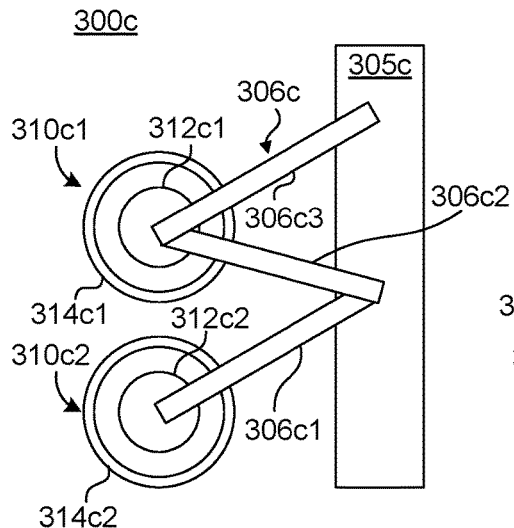

FIG. 3C illustrates a battery module 300c, which can be a portion of a battery module or battery pack. In FIG. 3C, a busbar 305c, an end 310c1 of a first electrochemical cell, an end 310c2 of a second electrochemical cell, and a bond wire 306c of the battery module 300c are shown. The end 310c1 of the first electrochemical cell includes a terminal 312c1 and a rim 314c1. The end 310c2 of the second electrochemical cell includes a terminal 312c2 and a rim 314c2. The bond wire 306c includes segments 306c1, 306c2 and 306c3.

In the battery module 300c, the bond wire 306c electrically couples the busbar 305c with the terminals 312c1 and 312b2 via multiple-direction wire bonding. For instance, in this example, the segment 306c1 of the bond wire 306c is wire bonded to the terminal 312c2 and the busbar 305b. Further in this example, the segment 306c2 is wire bonded to the terminal 312c1, where a first bend in the bond wire 306c changes a direction along which the segment 306c2 is arranged, relative to a direction along which the segment 306c1 is arranged. Still further in this example, the segment 306c3 is wire bonded to the busbar 305c, where a second bend in the bond wire 306c changes a direction along which the segment 306c3 is arranged, relative to a direction along which the segment 306c2 is arranged.

That is, in this example, a first end of the bond wire 306c is wire bonded to a first electrical contact surface (e.g., that is part of the terminal 312c2), a second end of the bond wire 306c is wire bonded to a second electrical contact surface (e.g., that is part of the busbar 305). Further in this example, a portion of the bond wire 306c that is intermediate between its first end and its second end is wire bonded to a third electrical contact surface (e.g., that is part of the busbar 305c) and a fourth electrical contact surface (e.g., that is part of the terminal 312c1). The portion of the bond wire 306c that is intermediate between its first end and its second, in this example, includes the segments 306c1, 306c2 and 306c3.

Figure 3D:
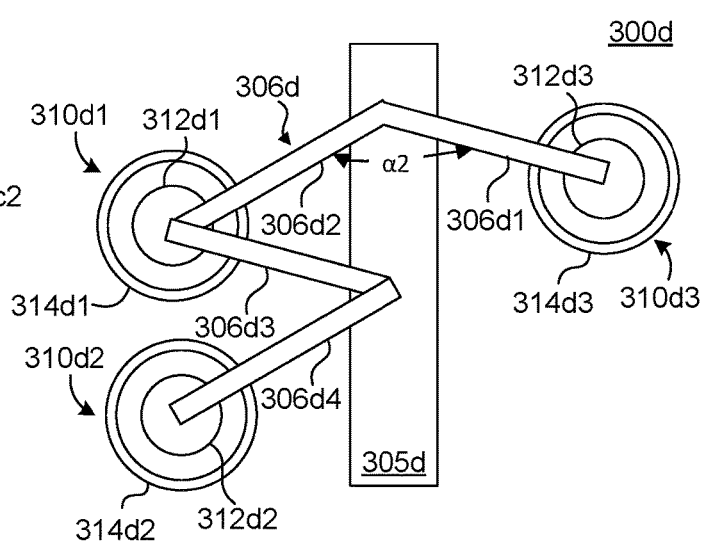

FIG. 3D illustrates a battery module 300d, which can be a portion of a battery module or battery pack. In FIG. 3D, a busbar 305d, an end 310d1 of a first electrochemical cell, an end 310d2 of a second electrochemical cell, an end 310d3 of a third electrochemical cell, and a bond wire 306d of the battery module 300d are illustrated. In this example, the end 310d1 of the first electrochemical cell includes a terminal 312d1 and a rim 314d1. The end 310d2 of the second electrochemical cell includes a terminal 312d2 and a rim 314d2. The end 310d3 of the third electrochemical cell includes a terminal 312d3 and a rim 314d3. The bond wire 306d includes segments 306d1, 306d2, 306d3 and 306d4.

In the battery module 300d, the bond wire 306d electrically couples the busbar 305d with the terminals 312d1, 312d2 and 312d3 via multiple-direction wire bonding. For instance, the segment 306d1 of the bond wire 306d, in this example, is wire bonded to the terminal 312d3 and the busbar 305d. Further in this example, the segment 306d2 is wire bonded to the terminal 312d1, where a first bend in the bond wire 306d changes a direction along which the segment 306d2 is arranged, relative to a direction along which the segment 306d1 is arranged. In this instance, the segment 306d1 and the segment 306d2 define an angle α2. In some implementations, the angle α2 can be less than one-hundred-eighty degrees (180°) and less than about one-hundred-thirty-five degrees (135°). In other implementations, segments of bond wires used to implement multiple-direction wire bonds can define similar angles. In this instance, the bend between the segments 306d1 and 306d2 may not invert the bond wire 306d (e.g., will not change the surface of the bond wire that is wire bonded to the terminal 312d1, as compared to the surface of the segment 306d1 that is wire bonded to the terminal 312d3 and the busbar 305d).

Further in the example of FIG. 3D, the segment 306d3 is wire bonded to the busbar 305d, where a second bend in the bond wire 306d changes a direction along which the segment 306d3 is arranged, relative to a direction along which the segment 306d2 is arranged. Additionally in the example of FIG. 3D, the segment 306d4 is wire bonded to the terminal 312d2, where a third bend in the bond wire 306d changes a direction along which the segment 306d4 is arranged, relative to a direction along which the segment 306d3 is arranged.

That is, in this example, a first end of the bond wire 306d is wire bonded to a first electrical contact surface (e.g., that is part of the terminal 312d3), a second end of the bond wire 306d is wire bonded to a second electrical contact surface (e.g., that is part of the terminal 312d2). Further in this example, a portion of the bond wire 306d that is intermediate between its first end and its second end is wire bonded to a third electrical contact surface (e.g., that is part of the busbar 305c), a fourth electrical contact surface (e.g., that is part of the terminal 312d1), and a fifth electrical contact surface (e.g., this is part of the busbar 305). The portion of the bond wire 306d that is intermediate between its first end and its second, in this example, includes the segments 306d1, 306d2, 306d3 and 306d4.

Figure 3E:
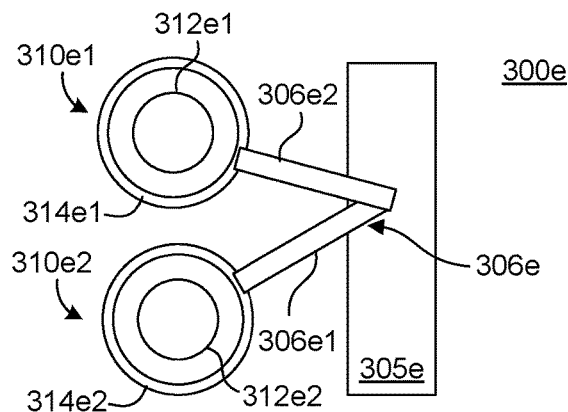

FIG. 3E illustrates a battery module 300e, which can be a portion of a battery module or battery pack. In FIG. 3E, a busbar 305e, an end 310e1 of a first electrochemical cell, an end 310e2 of a second electrochemical cell, and a bond wire 306e of the battery module 300e are shown. The end 310e1 of the first electrochemical cell includes a terminal 312e1 and a rim 314e1. The end 310e2 of the second electrochemical cell includes a terminal 312e2 and a rim 314e2. The bond wire 306e includes segments 306e1 and 306e2.

In the battery module 300e, the bond wire 306e electrically couples the busbar 305e with the rims 314e1 and 314e2 via multiple-direction wire bonding. For instance, the segment 306e1 of the bond wire 306e, in this example, is wire bonded to the rim 314e2 and the busbar 305e. Further in this example, the segment 306e2 is wire bonded to the rim 312e1, where a bend in the bond wire 306e changes a direction along which the segment 306e2 is arranged, relative to a direction along which the segment 306e1 is arranged.

That is, in this example, a first end of the bond wire 306e is wire bonded to a first electrical contact surface (e.g., that is part of the rim 314e2), a second end of the bond wire 306e is wire bonded to a second electrical contact surface (e.g., that is part of the rim 314e1). Further in this example, a portion of the bond wire 306e that is intermediate between its first end and its second end is wire bonded to a third electrical contact surface (e.g., that is part of the busbar 305e).

Figure 4A:
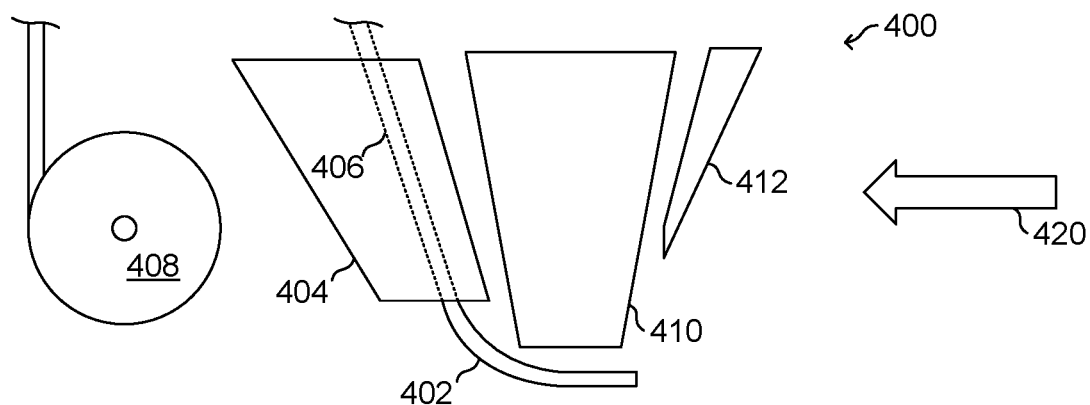
FIGS. 4A-4B are diagrams illustrating an example wedge bonder head for forming multiple-direction wedge wire bonds.
Figure 4B:
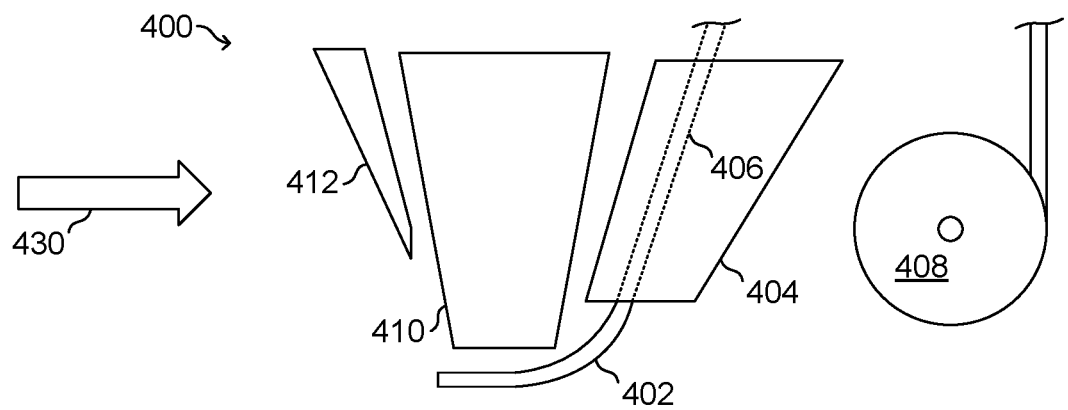

FIGS. 4A-4B are diagrams illustrating an example wedge bonder head 400 for forming multiple-direction wedge wire bonds. The wire bonder head 400 can be used with one or more other examples described elsewhere herein.

As shown in FIGS. 4A-4B, the wire bonder head 400 includes a wire guide 404. The wire guide 404 is used for guiding (e.g., feeding) the bond wire 402 during a multiple-direction wire bonding operation. The wire guide 404 can be made of one or more materials, including, but not limited to, a metal or a synthetic material. A supply 406 of the ribbon bond wire 402 is illustrated as passing through the wire guide 404. In some implementations, the supply 406 of the bond wire 402 can be provided from a spool 408. For example, the spool 408 can be rotatably suspended in relation to the wire bonder head 400 so as to allow the supply 406 of the bond wire 402 to be obtained in a continuous or intermittent fashion, and such that the bond wire 402 has a particular orientation relative to, e.g., an electrochemical cell, busbar, or other electrical contact surface for bonding.

The wire bonder head 400 includes a wedge 410. The wedge 410 can be used to bond the bond wire 402 to an electrical contact surface (not shown), such as the electrical contact surfaces described herein. For instance, ultrasonic vibration can be used to bond the bond wire to an electrical contact surface. In an example implementation, the wedge 410 can be made of metal. As can be seen in FIGS. 4A and 4B, the bond wire 402 is fed under the wedge from one side of the wedge. In current implementations, forming wedge bonds has been performed along a single, or linear path. In example implementations, the approaches described herein provide for multiple-direction wedge wire bonding, which can reduce resistance of wire bond interconnections and achieve improved performance of associated electrical assemblies, such as battery modules for use in vehicles, for example.

The wire bonder head 400 also includes a cutter 412. The cutter 412 can be used to sever the bond wire 402 before, during, or after performing multiple-direction wire bonding. For example, the cutter 412 can be made of metal.

As also shown by FIGS. 4A-4B, the wire bonder head 400 can have different directions of travel. By way of example, in FIG. 4A an arrow indicates a first direction of travel 420, while in FIG. 4B, an arrow indicates a second direction of travel 430 that is different than the first direction of travel. A particular direction of travel of the bonder head 400 can be achieved by rotating the bonder head 400, such as described herein. The direction of travel of the bonder head when forming wire bonds during a multiple direction bonding operation will depend on the particular implementation, and can be established by an amount of rotation (e.g., clockwise or counter-clockwise) of the bonder head 400 a previous orientation.

In example implementations, the bonder head 400 can be positioned (e.g., rotationally positioned) as shown in FIG. 4A. A first wire bond can be formed and the bonder head 400 then can move along the first direction of travel 420 and a second wire bond can be formed. Subsequently, the bonder head 400 can be positioned (e.g., rotationally positioned) as shown in FIG. 4B. The bonder head 400 can then move along the second direction of travel 430 and a third wire bond can be formed to produce multiple-direction wire bonds with a continuous bond wire (e.g., a continuous section of the bond wire 402). After forming the multiple-direction wire bonds, the cutter 412 can be used to sever the bond wire 402.

Figure 5:
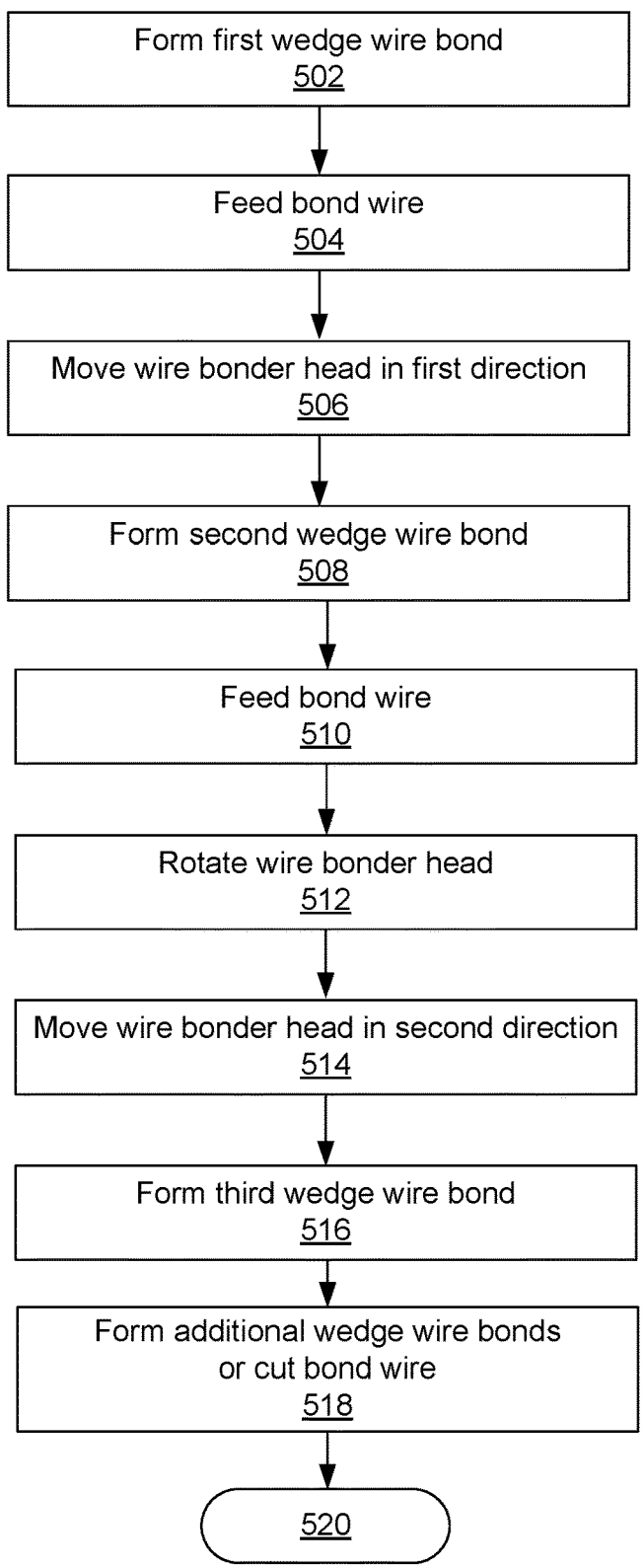
FIG. 5 is flowchart illustrating an example method.

FIG. 5 shows an example of a method 500. The method 500 can be used with one or more other examples described elsewhere herein. More or fewer operations than shown can be performed. Two or more operations can be performed in a different order unless otherwise indicated.

At operation 502, the method 500 can include forming a first wedge wire bond on a first electrical contact surface. At operation 504, the method 500 can include feeding the bond wire (e.g., through a wire guide) to form or deploy a segment of the bond wire (e.g., form a wire loop). At operation 506, the method 500 includes moving the wire bonder head in a first direction of travel. At operation 508, the method 500 includes forming a second wedge wire bond between the bond wire and a second electrical contact surface.

At operation 510, the method 500 includes feeding the bond wire to form or deploy another segment of the bond wire (e.g., form another wire loop). The method 500 further includes, at operation 512, rotating the wire bonder head and, at operation 514, moving the bonder head in a second direction of travel, the second direction of travel being different from the first direction of travel (506). At operation 516, the method 500 includes forming a third wedge wire bond between the bond wire and a third electrical contact surface. At operation 518, the method 500 includes forming additional wire bonds (e.g., in other directions), or cutting the bond wire to compete the multiple-direction wire bonding process.

At operation 520, zero, one or more operations can be performed. In some implementations, the method 500 can end at operation 520, e.g. after performing the operations 502-518. In some implementations, some or all of the operations 502-518 can be performed at the operation(s) 510 regarding performing another multiple-direction wire bonding process.

The terms "substantially", "about" and "approximately" used throughout this Specification are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%. Also, when used herein, an indefinite article such as "a" or "an" means "at least one."

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

A number of implementations have been described. Nevertheless, it will be understood that various modifications may be made without departing from the spirit and scope of the specification.

In addition, the logic flows depicted in the figures do not require the particular order shown, or sequential order, to achieve desirable results. In addition, other processes may be provided, or processes may be eliminated, from the described flows, and other components may be added to, or removed from, the described systems. Accordingly, other implementations are within the scope of the following claims.

While certain features of the described implementations have been illustrated as described herein, many modifications, substitutions, changes and equivalents will now occur to those skilled in the art. It is, therefore, to be understood that appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. An electrical device assembly comprising:
   a first electrical contact surface;
   a second electrical contact surface;
   a third electrical contact surface, the first and second electrical contact surfaces being spaced from the third electrical contact surface in a common direction; and a ribbon wire electrically coupling the first electrical contact surface with each of the second electrical contact surface and the third electrical contact surface, wherein a first end of the ribbon wire is wedge bonded to the first electrical contact surface with a first wedge wire bond, wherein a second end of the ribbon wire is wedge bonded to the second electrical contact surface with a second wedge wire bond, and wherein a portion of the ribbon wire that is intermediate between the first and second ends is wedge bonded to the third electrical contact surface with a third wedge wire bond.

2. The electrical device assembly of claim 1, wherein:
the electrical device assembly includes a battery module that includes a busbar and an electrochemical cell;
the busbar includes the first electrical contact surface and the second electrical contact surface; and
a terminal of the electrochemical cell includes the third electrical contact surface, the terminal being located at an end of the electrochemical cell.

3. The electrical device assembly of claim 2, where the terminal includes one of a rim of the electrochemical cell or a cap of the electrochemical cell.

4. The electrical device assembly of claim 1, wherein:
a first segment of the ribbon wire extends between the first wedge wire bond and the third wedge wire bond;
a second segment of the ribbon wire extend between the third wedge wire bond and the second wedge wire bond; and
the first segment of ribbon wire and the second segment of the ribbon wire define an angle less than about 45 degrees.

5. The electrical device assembly of claim 4, wherein:
the ribbon wire includes a first surface and a second surface opposite the first surface;
the first surface of the ribbon wire faces the first electrical contact surface and the third electrical contact surface; and
the second surface of the ribbon wire faces the second electrical contact surface.

6. The electrical device assembly of claim 1, wherein the first electrical contact surface, the second electrical contact surface and the third electrical contact surface are each respectively included in one of:
a busbar of a battery module; or
a terminal of an electrochemical cell of the battery module.

7. The electrical device assembly of claim 1, wherein:
the first electrical contact surface is included in a terminal of a first electrochemical cell of a battery module;
the second electrical contact surface is included in a terminal of a second electrochemical cell of the battery module; and
the third electrical contact surface is included in a busbar of the battery module.

8. The electrical device assembly of claim 1, wherein:
the portion of the ribbon wire that is intermediate between the first end and the second end is a first portion of the ribbon wire that is intermediate between the first end and the second end;
the electrical device assembly includes a fourth electrical contact surface that is separate from the first electrical contact surface, the second electrical contact surface and the third electrical contact surface; and a second portion of the ribbon wire that is intermediate between the first end and the second end is wedge bonded to the fourth electrical contact surface with a fourth wedge wire bond.

9. The electrical device assembly of claim 8, wherein:
a first segment of the ribbon wire extends between the first wedge wire bond and the third wedge wire bond;
a second segment of the ribbon wire extends between the third wedge wire bond and the fourth wedge wire bond; and
a third segment of the ribbon wire extends between the fourth wedge wire bond and the second wedge wire bond;
the first segment of the ribbon wire and the second segment of the ribbon wire define an angle less than about 45 degrees.

10. The electrical device assembly of claim 9, wherein the second segment of the ribbon wire and the third segment of the ribbon wire define an angle greater than about 135 degrees.

11. The electrical device assembly of claim 9, wherein the second segment of the ribbon wire and the third segment of the ribbon wire define an angle less than about 45 degrees.

12. The electrical device assembly of claim 8, wherein the first electrical contact surface, the second electrical contact surface, the third electrical contact surface and the fourth electrical contact surface are each included, respectively, in one of a busbar of a battery module or an electrochemical cell of the battery module.

13. A battery module comprising:
a plurality of electrochemical cells, each electrochemical cell of the plurality of electrochemical cells having a terminal at an end of the electrochemical cell;
a busbar to couple the plurality of electrochemical cells in one of a parallel connection, a series connection, or a parallel and series connection; and
a ribbon bond wire that is:
electrically coupled with the busbar via a first wedge bond and a second wedge bond, and
electrically coupled with the terminal of an electrochemical cell of the plurality of electrochemical cells via a third wedge bond,
wherein:
a first segment of the ribbon bond wire extends between the first wedge bond and the third wedge bond,
a second segment of the ribbon bond wire extends between the third wedge bond and the second wedge bond, and
the first segment of the ribbon bond wire and the second segment of the ribbon bond wire define an angle of less than about 45 degrees.

14. The battery module of claim 13, where the terminal of the electrochemical cell of the plurality of electrochemical cells includes one of a rim or a cap.

15. The battery module of claim 13, wherein:
the electrochemical cell of the plurality of electrochemical cells is a first electrochemical cell; and
the ribbon bond wire is further electrically coupled with the terminal of a second electrochemical cell of the plurality of electrochemical cells via a fourth wedge bond,
a third segment of the ribbon bond wire extending between the second wedge bond and the fourth wedge bond.

16. The battery module of claim 15, wherein the second segment of the ribbon bond wire and the third segment of the ribbon bond wire define an angle of less than 45 degrees.

17. The battery module of claim 15, wherein the second segment of the ribbon bond wire and the third segment of the ribbon bond wire define an angle of greater than 135 degrees.

18. A method comprising:
- forming, using a wedge wire bonder head, a first wedge wire bond with a ribbon wire on a first electrical contact surface;
- after forming the first wedge wire bond, feeding a first portion of the ribbon wire through the wedge wire bonder head;
- moving the wedge wire bonder head along a first direction of travel to form a first wire loop including the first portion of the ribbon wire;
- forming, using the wedge wire bonder head, a second wedge wire bond with the ribbon wire on a second electrical contact surface;
- after forming the second wedge wire bond, feeding a second portion of the ribbon wire through the wedge wire bonder head;
- rotating the wedge wire bonder head;
- moving the wedge wire bonder head along a second direction of travel, different from the first direction of travel, to form a second wire loop including the second portion of the ribbon wire; and
- forming, using the wedge wire bonder head, a third wedge wire bond with the ribbon wire on a third electrical contact surface.

19. The method of claim 18, wherein rotating the wedge wire bonder head include rotating the wedge wire bonder head between about 45 degrees and about 180 degrees.

20. The method of claim 18, further comprising:
- feeding a third portion of the ribbon wire through the wedge wire bonder head;
- further altering the direction of travel of the wedge wire bonder head by further rotating the wedge wire bonder head;
- moving the wedge wire bonder head along the further altered direction of travel to form a third wire loop including the third portion of the ribbon wire; and
- forming, using the wedge wire bonder head, a fourth wedge wire bond with the ribbon wire on a fourth electrical contact surface.

* * * * *